US012573542B2

(12) United States Patent
Cho et al.

(10) Patent No.: US 12,573,542 B2
(45) Date of Patent: Mar. 10, 2026

(54) COIL COMPONENT

(71) Applicant: SAMSUNG ELECTRO-MECHANICS CO., LTD., Suwon-si (KR)

(72) Inventors: Min Ji Cho, Suwon-si (KR); Jae Hun Kim, Suwon-si (KR); Ji Man Ryu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 973 days.

(21) Appl. No.: 17/742,968

(22) Filed: May 12, 2022

(65) Prior Publication Data

US 2022/0415564 A1 Dec. 29, 2022

(30) Foreign Application Priority Data

Jun. 25, 2021 (KR) ........................ 10-2021-0083250

(51) Int. Cl.
*H01F 27/29* (2006.01)

(52) U.S. Cl.
CPC .................................... *H01F 27/29* (2013.01)

(58) Field of Classification Search
CPC ........................................................ H01F 27/29
See application file for complete search history.

(56) References Cited

U.S. PATENT DOCUMENTS

2015/0102891 A1* 4/2015 Yoon .................. H01F 27/2804 336/200
2016/0351319 A1* 12/2016 Jeong .................. H01F 17/0033
2017/0256352 A1* 9/2017 Kido .................. H01F 27/2804
2018/0130596 A1 5/2018 Yamaguchi
2018/0286561 A1* 10/2018 Shimoichi ............... H01F 27/28
2019/0088406 A1* 3/2019 Kim .................... H01F 27/2804
2019/0096564 A1* 3/2019 Park .................... H01F 17/0013
(Continued)

FOREIGN PATENT DOCUMENTS

JP 2002270428 A * 9/2002
JP 2010080550 A * 4/2010
(Continued)

OTHER PUBLICATIONS

Wurth, "WE-MAPI, 2510 Wire-wound SMD Inductor with a Composite Iron Powder Core, 4.7 μH ±20% Moulded 940mA Idc" (https://sg.rs-online.com/web/p/wire-wound-surface-mount-inductors/7922720/).

(Continued)

*Primary Examiner* — Malcolm Barnes
(74) *Attorney, Agent, or Firm* — MORGAN, LEWIS & BOCKIUS LLP

(57) ABSTRACT

A coil component includes: a body; a coil portion including a coil pattern disposed in the body and first and second lead portions exposed to a first surface of the body to be spaced apart from each other; and first and second external electrodes disposed on the first surface of the body and spaced apart from each other and connected to the first and second lead portions, respectively, wherein in a cross-section perpendicular to the first surface of the body, a curved portion having a radius of curvature of 1 μm or more is formed in a region in which each of the first and second lead portions and an outermost turn of the coil pattern are connected to each other.

18 Claims, 8 Drawing Sheets

(56) References Cited

U.S. PATENT DOCUMENTS

| | | | | |
|---|---|---|---|---|
| 2019/0333684 | A1* | 10/2019 | Li | H01F 27/28 |
| 2019/0333686 | A1* | 10/2019 | Kazuta | H01F 27/2804 |
| 2020/0194167 | A1* | 6/2020 | Lee | H01F 27/292 |
| 2021/0090784 | A1 | 3/2021 | Kim et al. | |
| 2022/0068545 | A1 | 3/2022 | Kim et al. | |

FOREIGN PATENT DOCUMENTS

| | | | |
|---|---|---|---|
| JP | 2010287722 | A | * 12/2010 |
| KR | 10-2015-0114924 | A | 10/2015 |
| KR | 10-1662209 | B1 | 10/2016 |
| KR | 10-2019-0062342 | A | 6/2019 |
| KR | 10-2191248 | B1 | 12/2020 |
| KR | 10-2022-0029210 | A | 3/2022 |
| WO | 2017/018109 | A1 | 2/2017 |

OTHER PUBLICATIONS

Office Action issued in corresponding Korean Patent Application No. 10-2021-0083250 on Aug. 25, 2025, with English translation.

* cited by examiner

COIL COMPONENT

CROSS-REFERENCE TO RELATED APPLICATION(S)

This application claims the benefit of priority to Korean Patent Application No. 10-2021-0083250 filed on Jun. 25, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device, together with a resistor and a capacitor.

In accordance with gradual improvements in performance and decreases in the size of electronic devices, the number of electronic components used in the electronic devices has increased, and sizes of electronic components have decreased.

In a case of a thin film-type coil component, a body is formed by stacking and hardening magnetic composite sheets having a form in which magnetic metal powder particles are dispersed in an insulating resin, on a substrate on which a coil portion is formed by plating, and external electrodes are formed on surfaces of the body.

SUMMARY

An aspect of the present disclosure may provide a coil component in which adhesive strengths of first and second lead portions may be increased.

An aspect of the present disclosure may also provide a coil component in which total turns of a coil portion may be increased.

According to an aspect of the present disclosure, a coil component may include: a body; a coil portion including a coil pattern disposed in the body and first and second lead portions extending to a first surface of the body to be spaced apart from each other; and first and second external electrodes disposed on the first surface of the body and spaced apart from each other and connected to the first and second lead portions, respectively, wherein in a cross-section perpendicular to the first surface of the body, a region in which each of the first and second lead portions and an outermost turn of the coil pattern are connected to each other includes a curved portion having a radius of curvature of 1 μm or more.

According to another aspect of the present disclosure, a coil component may include: a body having a first surface and a second surface opposing each other; a coil portion including a coil pattern disposed in the body and substantially perpendicular to the first surface of the body, and first and second lead portions connected to the coil pattern and extending to the first surface of the body to be spaced apart from each other; and first and second external electrodes disposed on the first surface of the body and spaced apart from each other and connected to the first and second lead portions, respectively. A region in which each of the first and second lead portions and an outermost turn of the coil pattern are connected to each other includes a curved portion having a radius of curvature of 1 μm or more, and the region in which each of the first and second lead portions and the outermost turn of the coil pattern are connected to each other is disposed closer to the first surface of the body than to the second surface of the body, based on a central portion of the body in a thickness direction.

According to still another aspect of the present disclosure, a coil component may include: a body having a first surface and first and second end surfaces opposing each other and each connected to the first surface; a coil portion including a coil pattern disposed in the body and first and second lead portions extending to the first surface of the body to be spaced apart from each other; and first and second external electrodes disposed on the first surface of the body and spaced apart from each other and connected to the first and second lead portions, respectively. Each of the first and second lead portions includes an anchor part which is bent from an outermost turn of the coil pattern and extends toward a respective one of the first and second end surfaces of the body, and an angle between an upper surface of each anchor part, opposing the first surface of the body, and an outer surface of the coil pattern is an acute angle, and a region in which the upper surface of each anchor part and the outer surface of the coil pattern are connected to each other has a curved portion.

BRIEF DESCRIPTION OF DRAWINGS

The above and other aspects, features, and advantages of the present disclosure will be clearly understood from the following detailed description taken in conjunction with the accompanying drawings, in which.

DETAILED DESCRIPTION

Figure 1:
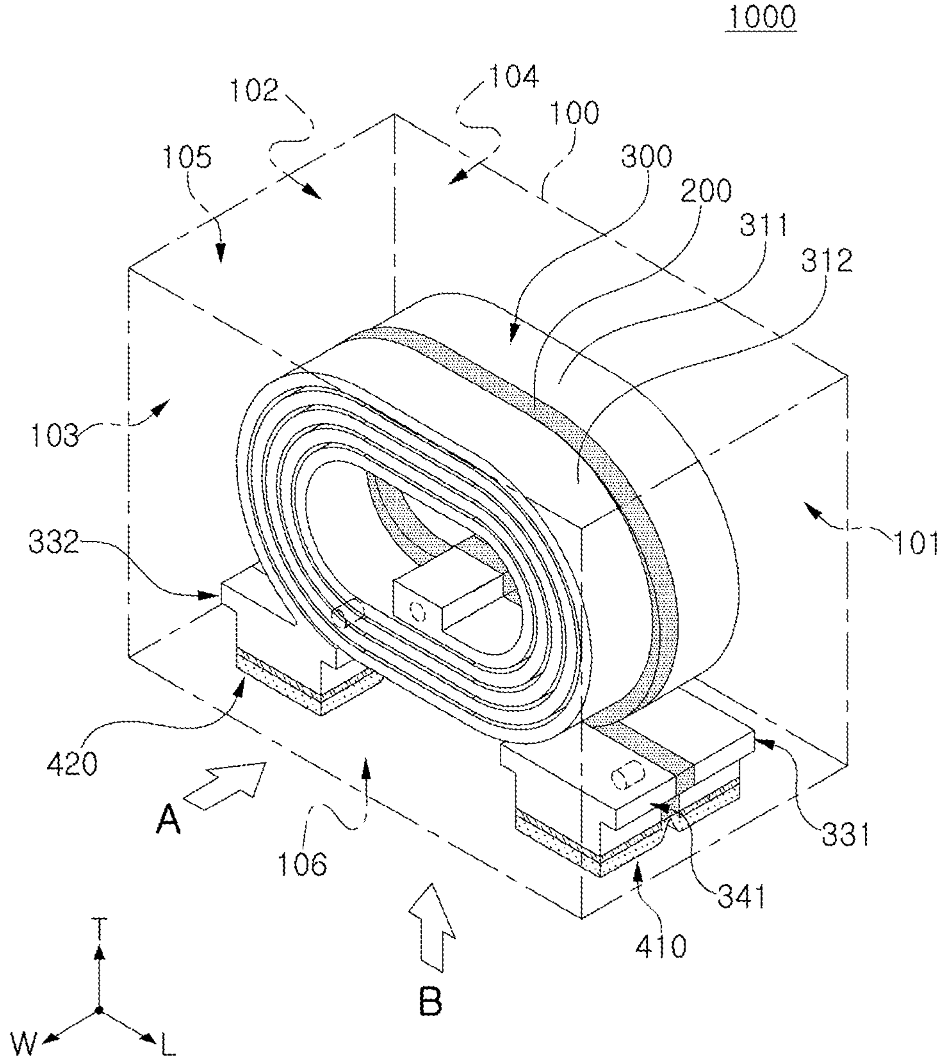
FIG. 1 is a schematic perspective view illustrating a coil component according to an exemplary embodiment in the present disclosure.

Terms used in the present specification are used only in order to describe specific exemplary embodiments rather than limiting the present disclosure. Singular forms are intended to include plural forms unless the context clearly indicates otherwise. It is to be understood that the term “include” or “have” used here specifies the presence of features, numbers, steps, operations, components, parts, or combinations thereof mentioned in the present specification, or combinations thereof, but does not preclude the presence or addition of one or more other features, numbers, steps, operations, components, parts, or combinations thereof. In addition, throughout the specification, “on” does not necessarily mean that any element is positioned on an upper side based on a gravity direction, but means that any element is positioned above or below a target portion.

Further, a term "couple" not only refers to a case where respective components are in physically direct contact with each other, but also refers to a case where the respective components are in contact with another component with another component interposed therebetween, in a contact relationship between the respective components.

Since sizes and thicknesses of the respective components illustrated in the drawings are arbitrarily illustrated for convenience of explanation, the present disclosure is not necessarily limited to those illustrated in the drawings.

In the drawings, an L direction refers to a first direction or a length direction, a W direction refers to a second direction or a width direction, and a T direction refers to a third direction or a thickness direction.

Hereinafter, coil components according to exemplary embodiments in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description thereof will be omitted.

Various types of electronic components may be used in electronic devices, and various types of coil components may be appropriately used between these electronic components depending on their purposes in order to remove noise, or the like.

That is, the coil components used in the electronic devices may be a power inductor, high frequency (HF) inductors, a general bead, a bead for a high frequency (GHz), a common mode filter, and the like.

Figure 2:
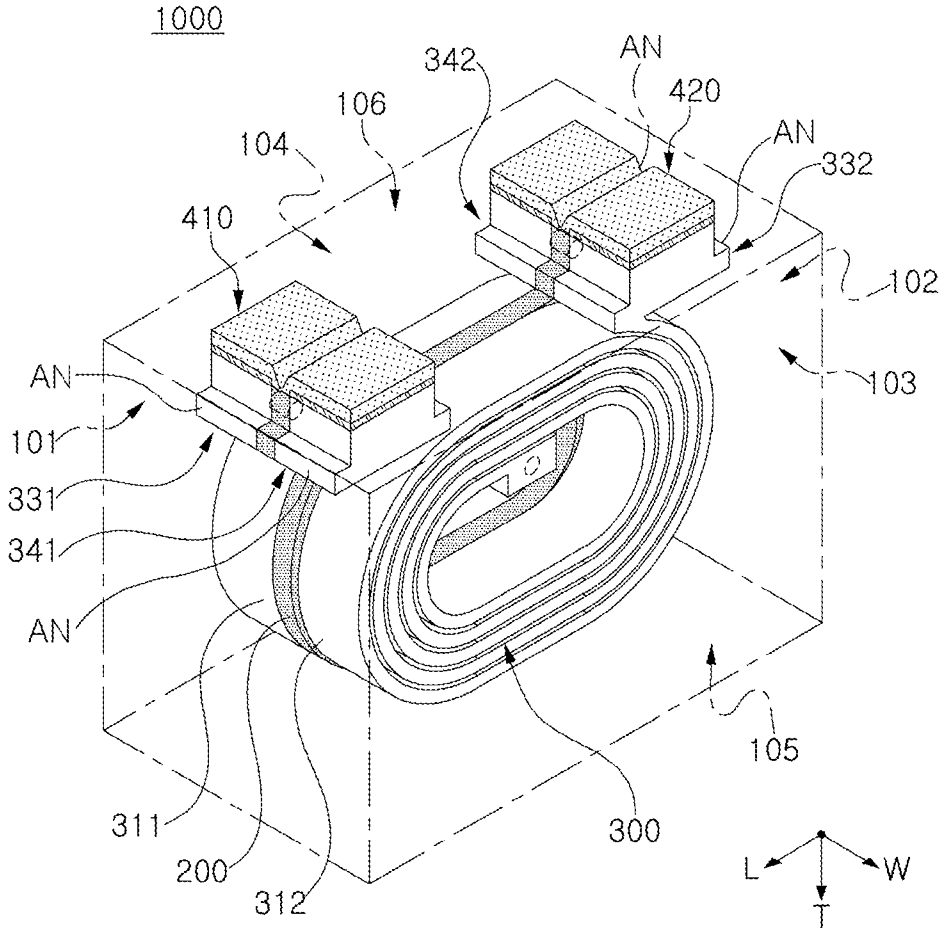
FIG. 2 is a schematic view of the coil component according to an exemplary embodiment in the present disclosure when viewed from below.
Figure 3:
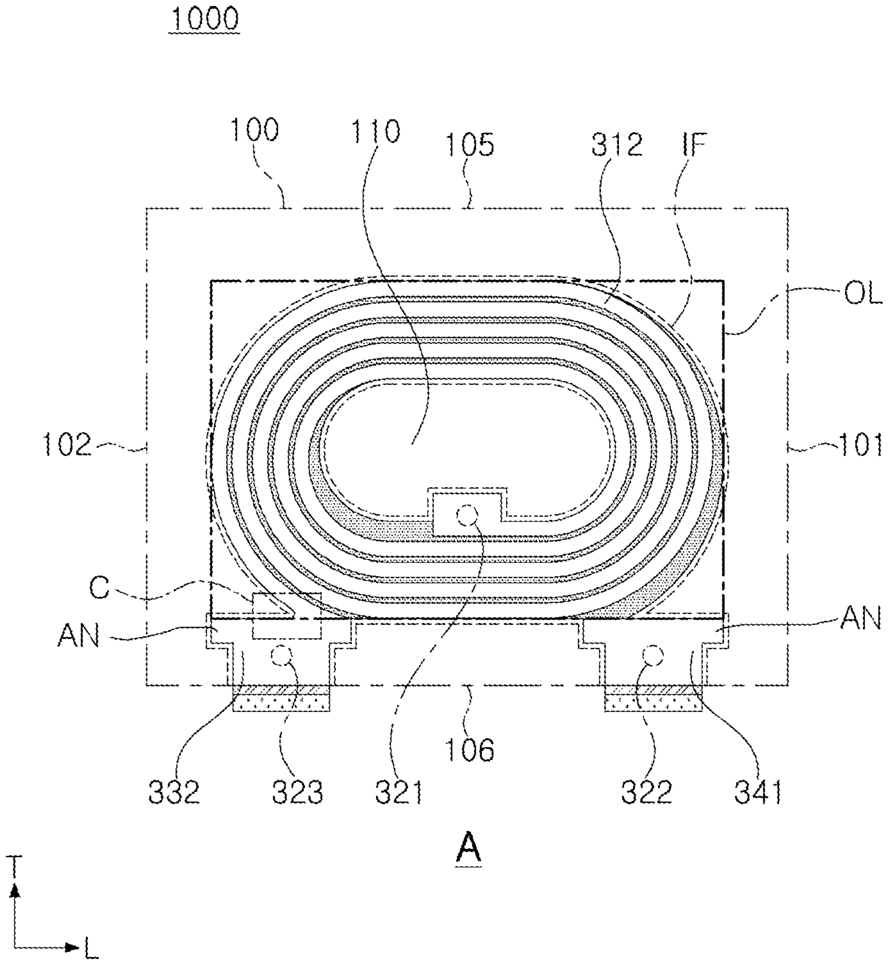
FIG. 3 is a schematic view of the coil component when viewed in direction A of FIG. 1.
Figure 4:
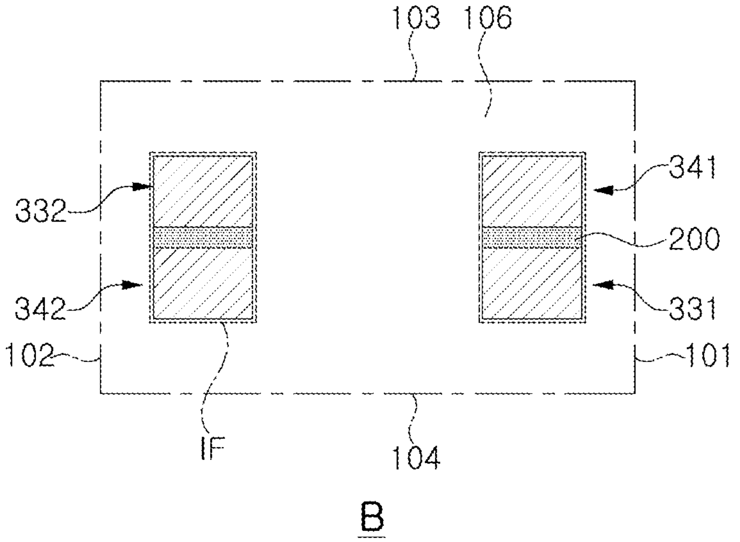
FIG. 4 is a schematic view of the coil component when viewed in direction B of FIG. 1.
Figure 5:
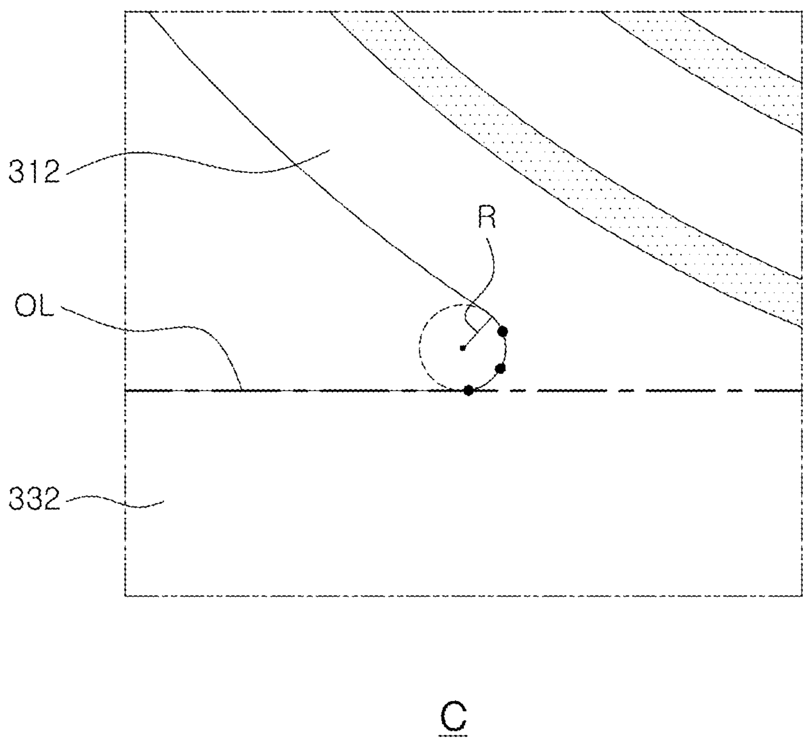
FIG. 5 is a schematic enlarged view of portion C of FIG. 3.
Figure 6:
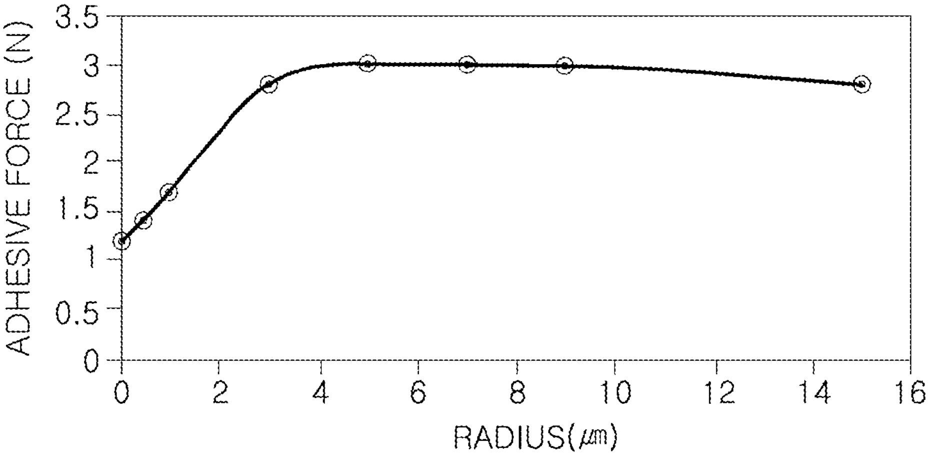
FIG. 6 is a graph illustrating a relationship between a radius of curvature of a curved portion and adhesive strength of a lead portion.

FIG. 1 is a schematic view illustrating a coil component according to an exemplary embodiment in the present disclosure. FIG. 2 is a schematic view of the coil component according to an exemplary embodiment in the present disclosure when viewed from below. FIG. 3 is a schematic view of the coil component when viewed in direction A of FIG. 1. FIG. 4 is a schematic view of the coil component when viewed in direction B of FIG. 1. FIG. 5 is a schematic enlarged view of portion C of FIG. 3. FIG. 6 is a graph illustrating a relationship between a radius of curvature of a curved portion and adhesive strength of a lead portion. Meanwhile, in each of FIGS. 1, 2 and 5, some components have not been illustrated in order to make an internal structure of a coil portion clearer. In addition, in FIG. 4, some components have not been illustrated in order to make an exposed structure of a lead portion clearer.

Referring to FIGS. 1 through 6, a coil component 1000 according to an exemplary embodiment in the present disclosure may include a body 100, a substrate 200, a coil portion 300, external electrodes 410 and 420, and an insulating film IF.

The body 100 may form an appearance of the coil component 1000 according to the present exemplary embodiment, and may embed the coil portion 300 therein.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101, 102, 103, and 104 of the body 100 may correspond to wall surfaces of the body 100 connecting the fifth surface 105 and the sixth surface 106 of the body 100 to each other. Hereinafter, opposite end surfaces (one end surface and the other end surface) of the body 100 may refer to the first surface 101 and the second surface 102 of the body, respectively, and opposite side surfaces (one side surface and the other side surface) of the body 100 may refer to the third surface 103 and the fourth surface 104 of the body, respectively. In addition, one surface and the other surface of the body 100 may refer to the sixth surface 106 and the fifth surface 105 of the body 100, respectively.

The body 100, for example, the coil component 1000 according to the present exemplary embodiment in which external electrodes 410 and 420 to be described later are formed may be formed to have a length of 1.6 mm, a width of 0.8 mm, and a thickness of 0.8 mm, may be formed to have a length of 1.0 mm, a width of 0.5 mm, a thickness of 0.8 mm, or may be formed to have a length of 0.8 mm, a width of 0.4 mm, and a thickness of 0.65 mm, but is not limited thereto. Meanwhile, the dimensions described above are merely design dimensions that do not reflect process errors and the like, and it is thus to be considered that dimensions within ranges admitted as the processor errors fall within the scope of the present disclosure.

The length of the coil component 1000 described above may refer to a maximum value of lengths of a plurality of segments connecting two outermost boundary lines, which oppose each other in the length direction L, of the coil component 1000 illustrated in an image of a cross-section of the coil component 1000 in the length direction L-thickness direction T at a central portion of the coil component 1000 in the width direction W, captured by an optical microscope or a scanning electron microscope (SEM), and are parallel to the length direction L. Alternatively, the length of the coil component 1000 described above may refer to a minimum value of lengths of a plurality of segments connecting two outermost boundary lines, which oppose each other in the length direction L, of the coil component 1000 illustrated in the image of the cross-section, and are parallel to the length direction L. Alternatively, the length of the coil component 1000 described above may refer to an arithmetic mean value of two or more of lengths of a plurality of segments connecting two outermost boundary lines, which oppose each other in the length direction L, of the coil component 1000 illustrated in the image of the cross-section, and are parallel to the length direction L.

The thickness of the coil component 1000 described above may refer to a maximum value of lengths of a plurality of segments connecting two outermost boundary lines, which oppose each other in the thickness direction T, of the coil component 1000 illustrated in an image of a cross-section of the coil component 1000 in the length direction L-thickness direction T at a central portion of the coil component 1000 in the width direction W, captured by an optical microscope or an SEM, and are parallel to the thickness direction T. Alternatively, the thickness of the coil component 1000 described above may refer to a minimum value of lengths of a plurality of segments connecting two outermost boundary lines, which oppose each other in the thickness direction T, of the coil component 1000 illustrated in the image of the cross-section, and are parallel to the thickness direction T. Alternatively, the thickness of the coil component 1000 described above may refer to an arithmetic mean value of two or more of lengths of a plurality of segments connecting two outermost boundary lines, which oppose each other in the thickness direction T, of the coil component 1000 illustrated in the image of the cross-section, and are parallel to the thickness direction T.

The width of the coil component 1000 described above may refer to a maximum value of lengths of a plurality of segments connecting two outermost boundary lines, which oppose each other in the width direction W, of the coil component 1000 illustrated in an image of a cross-section of the coil component 1000 in the length direction L-width direction W in a central portion of the coil component 1000 in the thickness direction T, captured by an optical microscope or an SEM, and are parallel to the width direction W. Alternatively, the width of the coil component 1000 described above may refer to a minimum value of lengths of a plurality of segments connecting two outermost boundary lines, which oppose each other in the width direction W, of the coil component 1000 illustrated in the image of the cross-section, and are parallel to the width direction W. Alternatively, the width of the coil component 1000 described above may refer to an arithmetic mean value of two or more of lengths of a plurality of segments connecting two outermost boundary lines, which oppose each other in the width direction W, of the coil component 1000 illustrated in the image of the cross-section, and are parallel to the width direction W.

Alternatively, each of the length, the width, and the thickness of the coil component 1000 may be measured by a micrometer measurement method. In the micrometer measurement method, each of the length, the width, and the thickness of the coil component 1000 may be measured by setting a zero point with a gage repeatability and reproducibility (R&R) micrometer, inserting the coil component 1000 according to the present exemplary embodiment between tips of the gage R&R micrometer, and turning a measuring lever of the gage R&R micrometer. Meanwhile, in measuring the length of the coil component 1000 by the micrometer measurement method, the length of the coil component 1000 may refer to a value measured once or refer to an arithmetic mean of values measured plural times. This may also be similarly applied to the width and the thickness of the coil component 1000.

The body 100 includes metal magnetic powder particles and an insulating resin. Specifically, the body 100 may be formed by stacking one or more magnetic composite sheets including an insulating resin and metal magnetic powder particles dispersed in the insulating resin.

The metal magnetic powder particles may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particles may be one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The magnetic metal powder particles may be amorphous or crystalline. For example, the metal magnetic powder particles may be Fe—Si—B—Cr based amorphous alloy powder particles, but are not necessarily limited thereto. The metal magnetic powder particles may have average diameters of about 0.1 μm to 30 μm, respectively, but are not limited thereto. In the present specification, a particle size or an average diameter may refer to a particle size distribution expressed as $D_{90}$ or $D_{50}$.

The body 100 may include two or more types of metal magnetic powder particles dispersed in the insulating resin. Here, different types of metal magnetic materials mean that the metal magnetic powder particles dispersed in the insulating resin are distinguished from each other by at least one of an average diameter, a composition, crystallinity, and a shape.

The insulating resin may include epoxy, polyimide, liquid crystal polymer (LCP), or the like, or mixtures thereof, but is not limited thereto.

The body 100 may include a core 110 penetrating through a substrate 200 and a coil portion 300 to be described later. The core 110 may be formed by filling a through-hole of the coil portion 300 with the magnetic composite sheets, but is not limited thereto.

The substrate 200 may be disposed in the body 100. The substrate 200 may be configured to support a coil portion 300 to be described later.

The substrate 200 may be formed of an insulating material including a thermosetting resin such as an epoxy resin, a thermoplastic resin such as a polyimide resin, or a photosensitive insulating resin or be formed of an insulating material having a reinforcing material such as a glass fiber or an inorganic filler impregnated in such an insulating resin. As an example, the substrate 200 may be formed of a material such as prepreg, an Ajinomoto Build-up Film (ABF), FR-4, a Bismaleimide Triazine (BT) resin, a photoimageable dielectric (PID), or a copper clad laminate (CCD), but is not limited thereto.

As the inorganic filler, one or more materials selected from the group consisting of silica ($SiO_2$), alumina ($Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the substrate 200 is formed of the insulating material including the reinforcing material, the substrate 200 may provide more excellent rigidity. When the substrate 200 is formed of an insulating material that does not include a glass fiber, it may be advantageous for decreasing a width of the coil component by decreasing the entire thickness of the substrate 200 and the coil portion 300 (refers to the sum of dimensions of the coil portion and the substrate along the width direction W in FIG. 1). When the substrate 200 is formed of an insulating material including the photosensitive insulating resin, the number of processes for forming the coil portion 300 may be decreased, which may be advantageous in decreasing a production cost and may be advantageous in forming fine vias.

The coil portion 300 may be disposed on the substrate 200. The coil portion 300 may be embedded in the body 100, and may implement characteristics of the coil component. For example, when the coil component 1000 according to the present exemplary embodiment is utilized as a power inductor, the coil portion 300 may serve to store an electric field as a magnetic field to maintain an output voltage, resulting in stabilization of power of an electronic device.

In the present exemplary embodiment, coil patterns 311 and 312 of the coil portion 300 may be disposed perpendicular to the sixth surface 106 of the body 100, which is a mounting surface, and a mounting area may thus be decreased while volumes of the body 100 and the coil portion 300 are maintained. Therefore, a larger number of electronic components may be mounted on a mounting substrate having the same area. In addition, in the present exemplary embodiment, the coil patterns 311 and 312 of the coil portion 300 may be disposed perpendicular to the sixth surface 106 of the body 100, which is the mounting surface, and a direction of a magnetic flux induced to the core 110 by the coil portion 300 may thus be disposed in parallel with the sixth surface 106 of the body 100. Therefore, noise induced to the mounting surface of the mounting substrate may be relatively decreased. Meanwhile, in the present specification, that the coil patterns 311 and 312 of the coil portion 300 are disposed perpendicular to the sixth surface 106 of the body 100, which is the mounting surface, means that when surfaces of first and second coil patterns 311 and 312 in contact with the substrate 200 virtually extend, an angle formed by the extending surfaces and the sixth surface 106 of the body 100 is perpendicular or close to perpendicularity (substantially perpendicular), as illustrated in FIG. 1. One or ordinary skill in the art would understand that the expression "substantially perpendicular" may mean not only being exactly perpendicular (90°) but also being close to perpendicularity including process errors, positional deviations, and/or measurement errors that may occur in a manufacturing process, and the range thereof may be widely accepted in the art. For example, the first and second coil patterns 311 and 312 may form an angle ranging from, e.g., 80° to 100° (but not limited thereto) with respect to the sixth surface 106 of the body 100.

The coil portion 300 may be formed on at least one of opposite surfaces of the substrate 200 opposing each other, and may include at least one turn. The coil portion 300 may be disposed on one surface and the other surface of the substrate 200 opposing each other in the width direction W of the body 100 in a form in which it is perpendicular to the sixth surface 106 of the body 100. In the present exemplary embodiment, the coil portion 300 may include coil patterns 311 and 312, vias 321, 322, and 323, and lead portions 331 and 341; 332 and 342.

The first coil pattern 311 and the second coil pattern 312 may be disposed on opposite surfaces of the substrate 200 opposing each other, respectively, and may each have a planar spiral shape in which at least one turn is formed around the core 110. As an example, in directions of FIG. 1, the first coil pattern 311 may be disposed on a rear surface of the substrate 200, and may include at least one turn formed around the core 110. The second coil pattern 312 may be disposed on a front surface of the substrate 200, and may include at least one turn formed around the core 110. The first and second coil patterns 311 and 312 may have a shape in which end portions of outermost turns connected to the lead portions 331 and 332 extend from a central portion of the body 100 in the thickness direction T of the body 100 toward the sixth surface 106 of the body 100. That is, regions in which the end portions of the outermost turns of the first and second coil patterns 311 and 312 and the lead portions 331 and 332 are connected to each other may be disposed closer to the sixth surface 106 of the body 100. Consequently, the first and second coil patterns 311 and 322 may increase total turns of the coil portion 300 as compared with a case where end portions of the outermost turns of coils are formed only up to a central portion of the body in the thickness direction T.

The lead portions 331 and 341; 332 and 342 may be exposed to the sixth surface 106 of the body 100 so as to be spaced apart from each other. In the present exemplary embodiment, the lead portions 331 and 341; 332 and 342 may include lead patterns 331 and 332 and sub-lead patterns 341 and 342. Specifically, in the directions of FIG. 1, the first lead portions 331 and 341 may include a first lead pattern 331 extending from the first coil pattern 311 on the rear surface of the substrate 200 and exposed to the sixth surface 106 of the body 100 and a first sub-lead pattern 341 disposed in a shape corresponding to the first lead pattern 331 at a position corresponding to the first lead pattern 331 on the front surface of the substrate 200 and spaced apart from the second coil pattern 312. Second lead portions 331 and 341 may include a second lead pattern 332 extending from the second coil pattern 312 on the front surface of the substrate 200 and exposed to the sixth surface 106 of the body 100 and a second sub-lead pattern 342 (see FIG. 2) disposed in a shape corresponding to the second lead pattern 332 at a position corresponding to the second lead pattern 332 on the rear surface of the substrate 200 and spaced apart from the first coil pattern 311. The first lead portions 331 and 341 and the second lead portions 332 and 342 may be exposed to the sixth surface of the body 100 so as to be spaced apart from each other, and may be in contact with and connected to first and second external electrodes 410 and 420 to be described later, respectively. Meanwhile, although not illustrated, penetration parts penetrating through the lead patterns 331 and 332 and the sub-lead patterns 341 and 342 may be formed in the lead patterns 331 and 332 and the sub-lead patterns 341 and 342. In this case, at least portions of the body 100 may be disposed in the penetration parts, and a coupling force between the body 100 and the coil portion 300 may thus be improved (an anchoring effect). Furthermore, the penetration parts may penetrate through the substrate 200 disposed between the lead patterns 331 and 332 and the sub-lead patterns 341 and 342, but the scope of the present disclosure is not limited thereto.

Meanwhile, the sub-lead patterns 341 and 342 described above may be components that may be omitted in the present exemplary embodiment in consideration of an electrical connection relationship between the coil portion 300 and external electrodes 410 and 420 to be described later, and it will thus be considered that a case where the sub-lead patterns 341 and 342 are omitted also falls within the scope of the present disclosure. However, as in the present exemplary embodiment, when the lead portions 331 and 341; 332 and 342 include the lead patterns 331 and 332 and the sub-lead patterns 341 and 342, the external electrodes 410 and 420 may be symmetrically formed on the sixth surface 106 of the body 100, and an appearance defect may thus be decreased.

A first via 321 may penetrate through the substrate 200 to connect inner end portions of the innermost turns of the first and second coil patterns 311 and 312 to each other. A second via 322 may penetrate through the substrate 200 to connect the first lead pattern 331 and the first sub-lead pattern 341 to each other. A third via 323 may penetrate through the substrate 200 to connect the second lead pattern 332 and the second sub-lead pattern 342 to each other. In such a manner, the coil portion 300 may function as one coil connected as a whole.

Meanwhile, as described above, the sub-lead patterns 341 and 342 may be components unrelated to an electrical connection relationship between the coil portion 300 and external electrodes 410 and 420 to be described later, and it will thus be considered that a case where the second ad third vias 322 and 323 are omitted all falls within the scope of the present disclosure. However, when the lead patterns 331 and 332 and the sub-lead patterns 341 and 342 are connected to each other through the second and third vias 322 and 323, respectively, as in the present exemplary embodiment, connection reliability between the coil portion 300 and the external electrode 410 and 420 may be improved.

At least one of the coil patterns 311 and 312, the vias 321, 322, and 323, the lead patterns 331 and 332, and the sub-lead patterns 341 and 342 may include at least one conductive layer.

As an example, when the second coil pattern 312, the vias 321, 322, and 323, the second lead pattern 332, and the first sub-lead pattern 341 are formed on the front surface of the substrate 200 by plating, each of the second coil pattern 312, the vias 321, 322, and 323, the second lead pattern 332, and the first sub-lead pattern 341 may include a seed layer and an electroplating layer. The seed layer may be formed by a vapor deposition method such as an electroless plating method or a sputtering method. Each of the seed layer and the electroplating layer may have a single-layer structure or have a multilayer structure. The electroplating layer having the multilayer structure may be formed in a conformal film structure in which another electroplating layer covers any one electroplating layer, or may be formed in a shape in which another electroplating layer is stacked on only one surface of any one electroplating layer. The seed layer of the second coil pattern 312, the seed layers of the first and third vias 321 and 323, and the seed layer of the second lead pattern 332 may be formed integrally with each other, such that boundaries therebetween may not be formed, but are not limited thereto. The electroplating layer of the second coil pattern 312, the electroplating layers of the first and third vias 321 and 323, and the electroplating layer of the second lead pattern 332 may be formed integrally with each other, such that boundaries therebetween may not be formed, but are not limited thereto.

Each of the coil patterns 311 and 312, the vias 321, 322, and 323, the lead patterns 331 and 332, and the sub-lead patterns 341 and 342 may include a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof, but is not limited thereto.

Each of the first and second lead portions 331 and 341; 332 and 342 may include an anchor part AN protruding toward an outer surface of the body 100. That is, the first lead pattern 331 may include an anchor part AN protruding toward the first surface 101 of the body 100 as compared with the remaining region of the first lead pattern 331. The first sub-lead pattern 341 may include an anchor part AN protruding toward the first surface 101 of the body 100 as compared with the remaining region of the first sub-lead pattern 341. The second lead pattern 332 may include an anchor part AN protruding toward the second surface 102 of the body 100 as compared with the remaining region of the second lead pattern 332. The second sub-lead pattern 342 may include an anchor part AN protruding toward the second surface 102 of the body 100 as compared with the remaining region of the second sub-lead pattern 342. Due to a structure in which the first and second lead portions 331 and 341; 332 and 342 include the anchor parts AN, resistance to an external force generated in the thickness direction T of the body 100 may increase (anchoring effect).

In one embodiment, each of the first and second lead portions 331 and 341; 332 and 342 may include the anchor part AN which is bent from a corresponding end of outermost turns of the first and second coil patterns 311 and 312 and extends toward a respective one of the first and second surfaces 101 and 102 of the body 100. Here, an angle between an upper surface of each anchor part AN, opposing the sixth surface 106 of the body 100, and an outer surface of the corresponding coil pattern 311 or 312 may be an acute angle.

Curved portions CP may be formed in regions in which the first and second lead portions 331 and 341; 332 and 342 and the outermost turns of the coil patterns 311 and 312 are connected to each other. As an example, referring to FIGS. 3 and 5, based on a cross-section perpendicular to the sixth surface 106 of the body 100, two boundary lines spaced apart from each other in the length direction L may be formed due to line widths of patterns themselves in a region in which an end portion of the outermost turn of the second coil pattern 312 and the second lead pattern 332 are connected to each other, and a curved portion CP having a radius of curvature R may be formed in a boundary line, which is close to the second surface 102 of the body 100, of the two boundary lines. The curved portion CP may be formed in a shape in which at least a portion of the region in which the end portion of the outermost turn of the second coil pattern 312 and the second lead pattern 332 are connected to each other is removed. The removed portion may be formed in a shape including an arc of a circle. The radius of curvature R of the curved portion CP may be measured or calculated by designating at least three virtual points disposed on a boundary line of the curved portion CP and using the at least three virtual points. For example, based on a cross-section (L-T cross-section) perpendicular to the six surface 106 of the body 100 taken from a central portion of a thickness of the second lead pattern 332 (for example, a central portion of the second lead pattern 332 in the width direction W in FIG. 1), a virtual outline OL having a rectangular shape may be set using the outermost two points facing each other in the length direction L and the outermost two points facing each other in the thickness direction T, formed by the outermost turn of the second coil pattern 312 and the substrate 200, and a point of the virtual outline OL where a virtual segment adjacent to the sixth surface 106 of the body 100 and the curved portion CP are in contact with each other may be set as the first virtual point P1. For example, based on the cross-section (L-T cross-section) perpendicular to the six surface 106 of the body 100 taken from the central portion of the thickness of the second lead pattern 332 (for example, the central portion of the second lead pattern 332 in the width direction W in FIG. 1), a point of the outermost turn of the second coil pattern 312 where a winding direction starts to change may be set as a second virtual point P2 of the curved portion CP. For example, a point disposed between the first virtual point P1 and the second virtual point P2 may be set as a third virtual point P3 of the curved portion CP. After the first to third virtual points P1, P2, and P3 are set as described above, the radius of curvature R of the curved portion CP may be measured or calculated by calculation. Since the curved portions CP are formed in the regions in which the first and second lead portions 331 and 341; 332 and 342 and the outermost turns of the coil patterns 311 and 312 are connected to each other, stress concentrated in these regions may be decreased in a process of stacking one or more magnetic composite sheets and subsequent processes. That is, in the present exemplary embodiment, the curved portions CP may be formed in these regions, and stress concentration may thus be prevented as compared with a case where these regions have an angular shape. Therefore, in the present exemplary embodiment, a phenomenon in which the first and second lead portions 331 and 341; 332 and 342 fall off may be prevented.

The radius of curvature R of the curved portion CP may be 1 μm or more. When the radius of curvature R of the curved portion CP is less than 1 μm, it may be difficult to secure an adhesive strength of 1.5 N or more, and an effect according to the present exemplary embodiment may thus be insignificant.

The radius of curvature R of the curved portion CP may be less than 15 μm. When the radius of curvature R of the curved portion CP is 15 μm or more, as compared with a case where the radius of curvature R of the curved portion CP is less than 15 μm, the above-described second virtual point P2 may be relatively moved toward the second surface 102 and the fifth surface 105 of the body 100, such that an effect of increasing the total turns of the coil may be insignificant.

Meanwhile, the curved portion CP and the radius of curvature R of the curved portion CP have been described based on the second coil pattern 312 and the second lead pattern 332 hereinabove, but such a description may be equally applied to the first coil pattern 311 and the first lead pattern 331.

Experimental Example

In Experimental Examples 1 to 8 of Table 1, adhesive strengths and whether or not to additionally secure a ¼ turn according to a position of the outermost turn of the coil pattern were evaluated while changing the radius of curvature R of the curved portion CP. In Experimental Examples 1 to 8, bodies were formed so that final components had a length of 0.8 mm, a width of 0.4 mm, and a thickness of 0.65 mm, and all of thicknesses, line widths, spaces between turns, and pitches between turns of coil patterns were designed to be the same each other.

In Table 1, adhesive strengths were measured based on strengths when cracks started to occur between lead portions and coil patterns connected to each other.

TABLE 1

| No. | Radius of Curvature R (μm) | Adhesive Strength (N) | Whether or not to Additionally Secure ¼ Turn |
|---|---|---|---|
| 1 | 0 | 1.2 | ○ |
| 2 | 0.5 | 1.4 | ○ |
| 3 | 1 | 1.7 | ○ |
| 4 | 3 | 2.8 | ○ |
| 5 | 5 | 3 | ○ |
| 6 | 7 | 3 | ○ |
| 7 | 9 | 3 | ○ |
| 8 | 15 | 2.8 | X |

Referring to Table 1 and FIG. 6, in Experimental Examples 1 and 2 in which the radius of curvature R is less than 1 μm, the adhesive strengths were 1.2N and 1.4N, respectively, which did satisfy a required adhesive strength of 1.5N or more. Meanwhile, the adhesive strength showed a tendency to increase as the radius of curvature R increased, but was measured to be saturated when the radius of curvature R was 9 μm.

Referring to Table 1, in Experimental Example 8 in which the radius of curvature R is 15 μm, a corresponding coil pattern could not additionally secure a ¼ turn. This is because the second virtual point P2 becomes relatively closer to the second surface 102 of the body 100 as the radius of curvature R increases, as described above.

The external electrodes 410 and 420 may be disposed on the sixth surface 106 of the body 100 so as to be spaced apart from each other, and may be connected to the lead portions 331, 332, 341, and 342, respectively. Specifically, the first external electrode 410 may be disposed on the sixth surface 106 of the body 100 and be in contact with the first lead portions 331 and 341. The second external electrode 420 may be disposed on the sixth surface 106 of the body 100 so as to be spaced apart from the first external electrode 410, and be in contact with the second lead portions 332 and 342. Meanwhile, as an example, the substrate 200 may be disposed between the first lead pattern 331 and the first sub-lead pattern 341 and be exposed to the sixth surface 106 of the body 100. In this case, a recess may be formed due to a plating deviation in a region of the first external electrode 410 corresponding to the substrate 200 exposed to the sixth surface 106 of the body 100, but is not limited thereto.

The external electrodes 410 and 420 may electrically connect the coil component 1000 to a printed circuit board or the like when the coil component 1000 according to the present exemplary embodiment is mounted on the printed circuit board or the like. As an example, the coil component 1000 according to the present exemplary embodiment may be mounted on the printed circuit board so that the sixth surface 106 of the body 100 faces an upper surface of the printed circuit board, and the external electrodes 410 and 420 disposed on the sixth surface of the body 100 so as to be spaced apart from each other and connection parts of the printed circuit board may be electrically connected to each other.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto.

Each of the external electrodes 410 and 420 may be formed as a plurality of layers. As an example, the first external electrode 410 may include a first layer in contact with the first lead portions 331 and 341 and a second layer disposed on the first layer. Here, the first layer may be a conductive resin layer including conductive powder particles including at least one of copper (Cu) and silver (Ag) and an insulating resin or be a copper (Cu) plating layer. The second layer may have a double-layer structure of a nickel (Ni) plating layer/tin (Sn) plating layer.

The insulating film IF may be disposed between the coil portion 300 and the body 100 so as to cover the coil portion 300. The insulating film IF may be formed along surfaces of the substrate 200 and the coil portion 300. The insulating film IF may be provided in order to insulate the coil portion 300 from the body 100, and may include a known insulating material such as parylene, but is not limited thereto. The insulating film IF may be formed by a method such as vapor deposition, but is not limited thereto, and may be formed by stacking insulating films on both surfaces of the substrate 200.

Meanwhile, although not illustrated, the coil component according to the present exemplary embodiment may further include a surface insulating layer covering the first to sixth surfaces 101 to 106 of the body 100, but exposing the external electrodes 410 and 420. The surface insulating layer may be formed by, for example, applying and hardening an insulating material including an insulating resin on the surface of the body 100. In this case, the surface insulating layer may include at least one of a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, and a photosensitive insulating resin.

Figure 7:
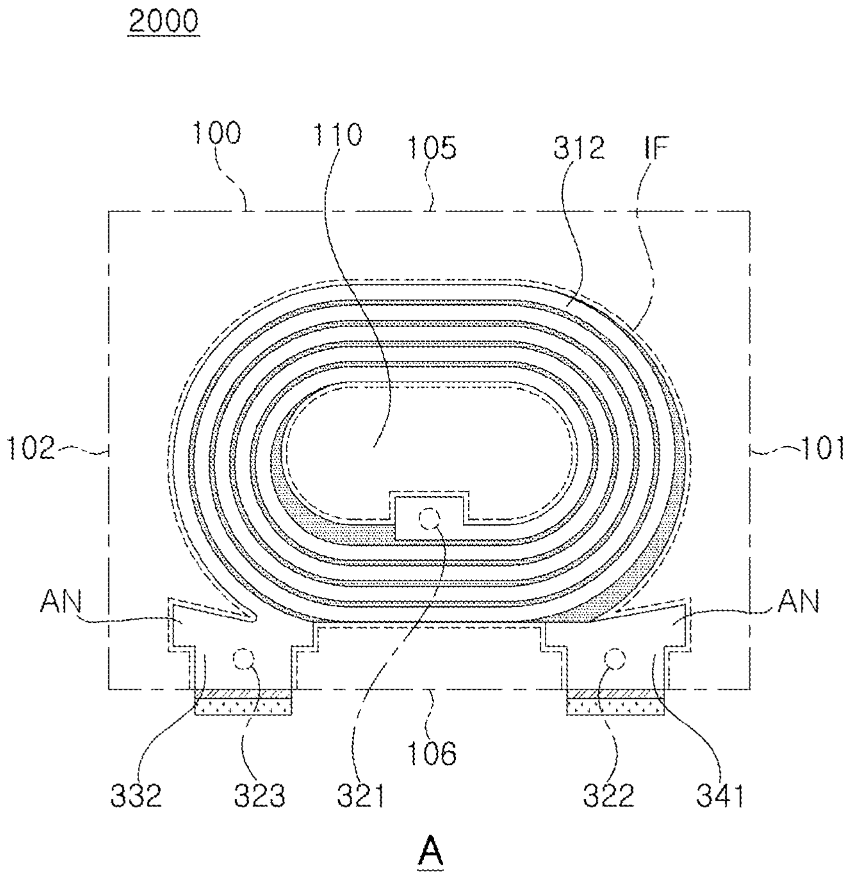
FIG. 7 is a schematic view illustrating a coil component according to another exemplary embodiment in the present disclosure and corresponding to FIG. 3.
Figure 8:
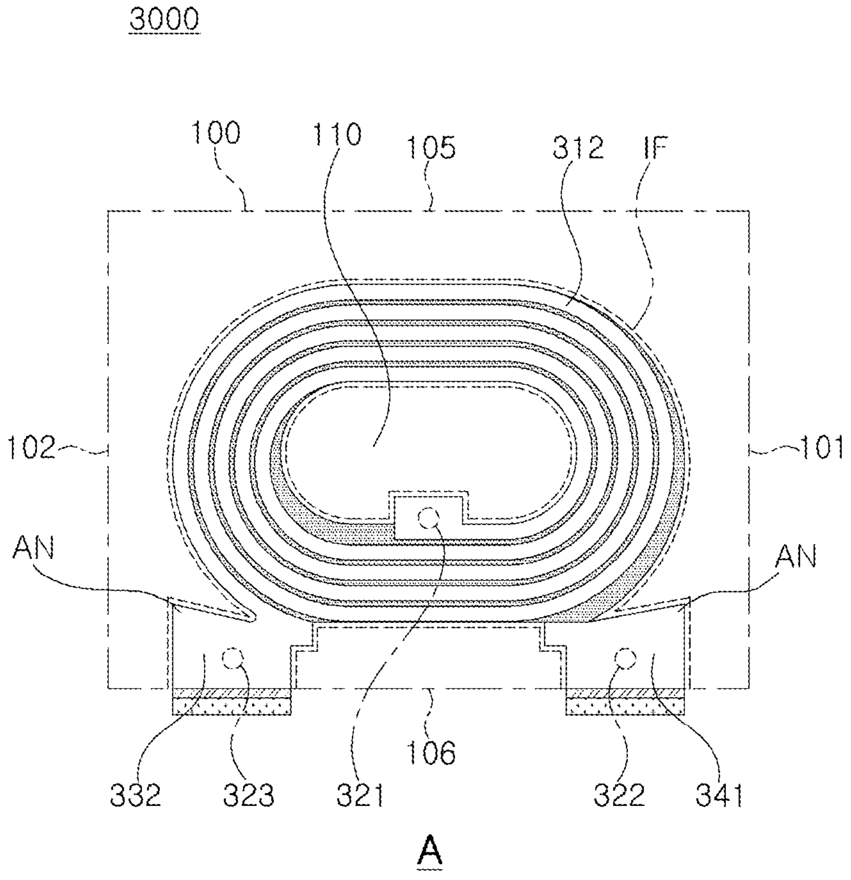
FIG. 8 is a schematic view illustrating a coil component according to another exemplary embodiment in the present disclosure and corresponding to FIG. 3.

FIG. 7 is a schematic view illustrating a coil component according to another exemplary embodiment in the present disclosure and corresponding to FIG. 3. FIG. 8 is a schematic view illustrating a coil component according to another exemplary embodiment in the present disclosure and corresponding to FIG. 3. Compared to FIG. 3, FIGS. 7 and 8 illustrate another exemplary embodiment and still another exemplary embodiment in the present disclosure, where each of coil components 2000 and 3000 may be different in shapes of anchor parts AN from the coil portion 1000 according to the previous exemplary embodiment in the present disclosure. Therefore, in describing the present exemplary embodiments, only the anchor parts AN different from those in an exemplary embodiment in the present disclosure will be described, and the description in an exemplary embodiment in the present disclosure may be applied to other components of the present exemplary embodiments as it is.

Compared to FIG. 3, FIGS. 7 and 8 show another exemplary embodiment and still another exemplary embodiment in the present disclosure, where each of coil components 2000 and 3000 may be different in shapes of anchor parts AN from the coil portion 1000 according to the previous exemplary embodiment in the present disclosure. Specifically, in another exemplary embodiment and another exemplary embodiment in the present disclosure, the first lead pattern 331 may include an anchor part AN protruding toward the fifth surface 105 of the body 100 as compared with the remaining region of the first lead pattern 331. The first sub-lead pattern 341 may include an anchor part AN protruding toward the fifth surface 105 of the body 100 as compared with the remaining region of the first sub-lead pattern 341. The second lead pattern 332 may include an anchor part AN protruding toward the fifth surface 105 of the body 100 as compared with the remaining region of the second lead pattern 332. The second sub-lead pattern 342 may include an anchor part AN protruding toward the fifth surface 105 of the body 100 as compared with the remaining region of the second sub-lead pattern 342. That is, an upper surface of the anchor part AN facing the fifth surface 105 of the body 100 may be angled upwardly with respect to the sixth surface 106 of the body 100, such that a distance between the upper surface of the anchor part AN and the sixth surface 106 of the body 100 continuously increases as being farther away from the region in which each of the first and second lead portions 331, 341, 332 and 342 and the outermost turn of the corresponding coil pattern are connected to each other. Particularly in FIG. 7, the anchor part AN of each of the first and second lead portions 331 and 341; 332 and 342 may further protrude toward the first surface 101 or the second surface 102 of the body 100. That is, the anchor parts AN applied to the coil portions 2000 and 3000 according to another exemplary embodiment and another exemplary embodiment in the present disclosure may be disposed so that end portions thereof face the fifth surface 105, unlike the anchor parts applied to the coil portion 1000 according to an exemplary embodiment in the present disclosure. In the present exemplary embodiments, due to the structures of the anchor parts AN described above, resistance to an external force generated in the length direction L of the body 100 as well as resistance to an external force generated in the thickness direction T of the body 100 may increase.

Comparing FIGS. 7 and 8 with each other, in the coil component 3000 according to still another exemplary embodiment in the present disclosure, lower sides of the anchor parts AN may extend in parallel with the first and second surfaces 101 and 102 of the body 100 and extend up to the sixth surface 106 of the body 100. In the coil component 3000 according to another exemplary embodiment in the present disclosure, contact areas between the lead portions 331 and 341; 332 and 342 and the external electrodes 410 and 420 may be increased while increasing resistance to external forces generated in the thickness direction T and the length direction L of the body, such that coupling reliability between the lead portions 331 and 341; 332 and 342 and the external electrodes 410 and 420 may be improved.

As set forth above, according to an exemplary embodiment in the present disclosure, adhesive strengths of the first and second lead portions may be increased.

According to another exemplary embodiment in the present disclosure, the total turns of the coil portion may be increased.

While exemplary embodiments have been shown and described above, it will be apparent to those skilled in the art that modifications and variations could be made without departing from the scope of the present invention as defined by the appended claims.

What is claimed is:

1. A coil component comprising:

a body;

a coil portion including a coil pattern disposed in the body and first and second lead portions extending to a first surface of the body to be spaced apart from each other; and first and second external electrodes disposed on the first surface of the body and spaced apart from each other and connected to the first and second lead portions, respectively, wherein in a cross-section perpendicular to the first surface of the body, a region in which each of the first and second lead portions and an outermost turn of the coil pattern are connected to each other includes a curved portion having a radius of curvature of 1 μm or more, and the radius of curvature of the curved portion is less than 15 μm.

2. The coil component of claim 1, wherein each of the first and second lead portions includes an anchor part protruding toward an outer surface of the body.

3. The coil component of claim 2, wherein the body has a first end surface and a second end surface each connected to the first surface of the body and opposing each other, and the anchor part of each of the first and second lead portions is disposed closer to the first end surface or the second end surface of the body than other regions of a respective one of the first and second lead portions.

4. The coil component of claim 2, wherein the body has a second surface opposing the first surface of the body, and the anchor part of each of the first and second lead portions is disposed closer to the second surface of the body than other regions of a respective one of the first and second lead portions.

5. The coil component of claim 2, wherein the coil pattern is disposed substantially perpendicular to the first surface of the body.

6. The coil component of claim 5, further comprising a substrate disposed in the body, wherein the coil pattern is disposed on at least one surface of the substrate.

7. The coil component of claim 6, wherein each of the first and second lead portions includes a lead pattern and a sub-lead pattern each disposed on opposite surfaces of the substrate to oppose each other.

8. The coil component of claim 7, wherein each of the first and second lead portions further includes a connection via penetrating through the substrate to connect the lead pattern and the sub-lead pattern to each other.

9. The coil component of claim 1, wherein the body has the second surface opposing the first surface of the body, and the region in which each of the first and second lead portions and the outermost turn of the coil pattern are connected to each other is disposed closer to the first surface of the body than to the second surface of the body.

10. A coil component comprising:

a body having a first surface and a second surface opposing each other;

a coil portion including a coil pattern disposed in the body and substantially perpendicular to the first surface of the body, and first and second lead portions connected to the coil pattern and extending to the first surface of the body to be spaced apart from each other; and first and second external electrodes disposed on the first surface of the body and spaced apart from each other and connected to the first and second lead portions, respectively, wherein a region in which each of the first and second lead portions and an outermost turn of the coil pattern are connected to each other includes a curved portion having a radius of curvature of 1 μm or more, the region in which each of the first and second lead portions and the outermost turn of the coil pattern are connected to each other is disposed closer to the first surface of the body than to the second surface of the body, based on a central portion of the body in a thickness direction, and the radius of curvature of the curved portion is less than 15 μm.

11. A coil component comprising:

a body having a first surface and a second surface opposing each other;

a coil portion including a coil pattern disposed in the body and substantially perpendicular to the first surface of the body, and first and second lead portions connected to the coil pattern and extending to the first surface of the body to be spaced apart from each other; and first and second external electrodes disposed on the first surface of the body and spaced apart from each other and connected to the first and second lead portions, respectively, wherein a region in which each of the first and second lead portions and an outermost turn of the coil pattern are connected to each other includes a curved portion having a radius of curvature of 1 μm or more, the region in which each of the first and second lead portions and the outermost turn of the coil pattern are connected to each other is disposed closer to the first surface of the body than to the second surface of the body, based on a central portion of the body in a thickness direction, wherein each of the first and second lead portions includes an anchor part protruding toward an outer surface of the body.

12. The coil component of claim 11, wherein the body has a first end surface and a second end surface each connected to the first surface of the body and opposing each other, and the anchor part of each of the first and second lead portions is disposed closer to the first end surface or the second end surface of the body than other regions of a respective one of the first and second lead portions.

13. The coil component of claim 11, wherein the body has a second surface opposing the first surface of the body, and the anchor part of each of the first and second lead portions is disposed closer to the second surface of the body than other regions of a respective one of the first and second lead portions.

14. The coil component of claim 11, wherein the body has a second surface opposing the first surface of the body, and a first end surface and a second end surface each connected to the first surface of the body and opposing each other, and the anchor part of each of the first and second lead portions protrudes toward the second surface of the body than other regions of a respective one of the first and second lead portions.

15. The coil component of claim 14, wherein an upper surface of the anchor part facing the second surface of the body is angled upwardly with respect to the first surface of the body, such that a distance between the upper surface of the anchor part and the first surface of the body continuously increases as being farther away from the region in which each of the first and second lead portions and the outermost turn of the coil pattern are connected to each other.

16. The coil component of claim 14, wherein the anchor parts of the first and second lead portions further protrude toward the first and second end surfaces of the body, respectively, than the other respective regions of the first and second lead portions.

17. A coil component comprising:

a body having a first surface and first and second end surfaces opposing each other and each connected to the first surface;

a coil portion including a coil pattern disposed in the body and first and second lead portions extending to the first surface of the body to be spaced apart from each other; and first and second external electrodes disposed on the first surface of the body and spaced apart from each other and connected to the first and second lead portions, respectively, wherein each of the first and second lead portions includes an anchor part which is bent from an outermost turn of the coil pattern and extends toward a respective one of the first and second end surfaces of the body, and an angle between an upper surface of each anchor part, opposing the first surface of the body, and an outer surface of the coil pattern is an acute angle, and a region in which the upper surface of each anchor part and the outer surface of the coil pattern are connected to each other has a curved portion.

18. The coil component of claim 17, wherein a radius of curvature of the curved portion is 1 μm or more and less than 15 μm.

* * * * *